(12) United States Patent
Nagai et al.

(10) Patent No.: US 8,578,592 B2
(45) Date of Patent: Nov. 12, 2013

(54) METHOD OF MANUFACTURING LAMINATED ROTOR CORE

(75) Inventors: Akira Nagai, Kitakyushu (JP); Mei Arazoe, Kitakyushu (JP); Go Kato, Kitakyushu (JP)

(73) Assignee: Mitsui High-Tec, Inc., Kitakyushu-shi, Fukuoka (JP)

( * ) Notice: Subject to any disclaimer, the term of this patent is extended or adjusted under 35 U.S.C. 154(b) by 0 days.

(21) Appl. No.: 13/509,190

(22) PCT Filed: Apr. 1, 2011

(86) PCT No.: PCT/JP2011/058452
§ 371 (c)(1),
(2), (4) Date: May 10, 2012

(87) PCT Pub. No.: WO2011/145399
PCT Pub. Date: Nov. 24, 2011

(65) Prior Publication Data
US 2012/0222289 A1    Sep. 6, 2012

(30) Foreign Application Priority Data

May 18, 2010   (JP) .................................. 2010-114552

(51) Int. Cl.
*H02K 15/03*   (2006.01)
*H02K 1/27*    (2006.01)

(52) U.S. Cl.
USPC ........................................ 29/598; 310/156.23

(58) Field of Classification Search
CPC ............................... H02K 1/276; H02K 15/03

USPC .................................. 29/598; 310/43, 156.23
See application file for complete search history.

(56) References Cited

U.S. PATENT DOCUMENTS

2009/0174273 A1    7/2009   Watanabe et al.

FOREIGN PATENT DOCUMENTS

| JP | 2002-247784 A | 8/2002 |
| JP | 2007-068356 A | 3/2007 |
| JP | 2009-303485 A | 12/2009 |
| JP | 4414417 B2 * | 2/2010 |

OTHER PUBLICATIONS

International Search Report of PCT/JP2011/058452, mailing date of Jun. 28, 2011.

* cited by examiner

*Primary Examiner* — Livius R Cazan
(74) *Attorney, Agent, or Firm* — Westerman, Hattori, Daniels & Adrian, LLP

(57) ABSTRACT

A method of manufacturing a laminated rotor core, includes a first process of placing segment dummy plates between an iron core and a die, each of each segment dummy plates covering one or more of plural magnet insertion portions and including a resin injection hole communicating to the one or more of the magnet insertion portions; a second process of injecting a resin from resin reservoir parts formed in any one of an upper die and a lower die holding the iron core through the resin injection hole of each segment dummy plate to the corresponding one or more of the magnet insertion portions; and a third process of detaching the segment dummy plates together with excess resin after the resin injected to the one or more of the magnet insertion portions is cured.

12 Claims, 13 Drawing Sheets

PRIOR ART

METHOD OF MANUFACTURING LAMINATED ROTOR CORE

TECHNICAL FIELD

The present invention relates to a method of manufacturing a laminated rotor core, the method including fixing permanent magnets inserted in a plurality of magnet insertion portions with resin.

BACKGROUND ART

Conventionally, magnet-molding is known as a method of fixing a permanent magnet to an iron core of a laminated rotor core used for a motor. In this method, the iron core having the permanent magnet inside a magnet insertion portion (magnet insertion hole) is heated to a certain temperature, and thereafter molding resin is injected into the magnet insertion portion and is heated and cured. That is how the permanent magnet is fixed to the iron core.

In this method, however, the resin cured after the injection remains attached to a surface of the iron core, and thus a process for removing such residual resin is required, which is a factor preventing reduction in lead time.

In view of the above, for example, Patent Document 1 discloses a method in which a metallic dummy plate 91 is placed on a surface (on a resin injection side) of an iron core 90, and molding resin (hereinafter simply referred to as resin) 93 is injected from a gate (small injection hole) 92 formed in the dummy plate 91 (see FIG. 13). In this method, the resin 93 cured after the injection remains attached not to the surface of the iron core 90 but to a surface of the dummy plate 91. Thus, by detaching the dummy plate 91 from the surface of the iron core 90, the residual resin can be removed together. Therefore, compared to the conventional method, lead time can be significantly reduced.

In the figure, a numeral 94 shows a permanent magnet. A numeral 95 shows a magnet insertion portion. Numerals 96, 97 show an upper die and a lower die for holding the iron core 90, respectively. A numeral 98 shows a resin reservoir pot. A numeral 99 shows a plunger for injecting the resin 93 from the resin reservoir pot 98 into the magnet insertion portion 95.

PRIOR ART DOCUMENTS

Patent Document

[Patent Document 1] Japanese Patent No. 4414417

SUMMARY OF INVENTION

Problems to be Solved by the Invention

However, the following problems arise when the laminated rotor core is manufactured with the dummy plate.

The dummy plate is one unified plate with a diameter larger than that of the iron core, covering the entire surface except a shaft hole of the iron core. When the iron core is set up in a molding die (resin-sealing device), an undulation of the surface of the iron core cannot be absorbed (filled) by the dummy plate. Then, a minimal gap is formed between the iron core and the dummy plate, and the resin leaks therefrom in some cases. In addition, the dummy plate has a large size and thus requires maintenance for preventing a warp (distortion) thereof.

The formation of the gap between the iron core and the dummy plate is reduced by increasing mold clamping pressure (tightening force). In this way, however, the flatness of the iron core may be lowered. What is worse, after a molding process, the resin may be cracked due to springback (i.e., force to return to original shapes) of core sheets each forming the iron core, and thus a gap is formed between the core sheets adjacent in a lamination direction.

When the dummy plate is used repeatedly, surrounding parts of the gates wear away, and thus the dummy plate needs to be exchanged even if all the gates do not wear away entirely. Therefore, a life and an exchange frequency of the dummy plate become short. To prevent this problem, the dummy plate may be preheated to increase its hardness. In this way, however, the undulation and warps are formed in the entire dummy plate, causing the leakage of the resin. The leakage is particularly significant in a larger-size dummy plate. Alternatively, the dummy plate may be thickened to increase its rigidity. By this way, however, an amount of the resin pooled inside the gate is increased, and an amount of the resin to be disposed is increased accordingly.

After the resin injection, the iron core and the dummy plate are stuck together with the residual resin inside the gates. However, in some cases when the dummy plate is detached from the iron core, the resin is stripped and dented in a depth direction at some of plural molded portions (magnet insertion portions), and surfaces of the permanent magnets are exposed outwardly. This is because, when the dummy plate is detached, force is applied in the same direction to all the molded portions.

The present invention has been made in view of the above circumstances and has an object to provide a method of manufacturing a laminated rotor core, eliminating a process for removing residual resin and preventing a leakage of resin, and thereby producing the laminated rotor core effectively and economically.

Means for Solving Problems

To accomplish the above object, the present invention provides a method of manufacturing a laminated rotor core, including laminating a plurality of core sheets to form an iron core with a plurality of magnet insertion portions, inserting permanent magnets into the magnet insertion portions of the iron core and injecting resin into the magnet insertion portions from resin reservoir parts formed in any one of an upper die and a lower die holding the iron core, and thereby fixing the permanent magnets, the method comprising: a first process of placing segment dummy plates between the iron core and the die, each of the segment dummy plates covering one or more of the plural magnet insertion portions and including a resin injection hole communicating to the one or more of the magnet insertion portions; a second process of injecting the resin from each of the resin reservoir parts of the die through the resin injection hole of the segment dummy plate to the corresponding one or more of the magnet insertion portions; and a third process of detaching the segment dummy plates together with excess resin after the resin injected to the one or more of the magnet insertion portions is cured.

In the method of manufacturing the laminated rotor core according to the present invention, it is possible that the resin from the resin reservoir part is injected into the corresponding one or more of the magnet insertion portions through (a) a resin passage formed on a surface of the die contacting the segment dummy plate or (b) the resin passage formed in the segment dummy plate and the resin injection hole communicating to the resin passage. In some cases, it is possible that when viewed from the above, the resin reservoir part and the magnet insertion portion are partly overlapped, and the resin from the resin reservoir part is injected directly into the corresponding one or more of the magnet insertion portions through the resin injection hole formed in the segment dummy plate.

In the method of manufacturing the laminated rotor core according to the present invention, it is possible that the die with the resin reservoir parts includes dummy plate recesses each housing the segment dummy plate, each of the segment dummy plates covers one part of the corresponding one or more of the magnet insertion portions and the die covers the other part of the one or more of the magnet insertion portions.

Also, in the method of manufacturing the laminated rotor core according to the present invention, the segment dummy plate may cover an entire part of the corresponding one or more of the magnet insertion portions.

Preferably, the dummy plate recesses each housing the segment dummy plates are provided in the die including the resin reservoir parts.

In the method of manufacturing the laminated rotor core according to the present invention, it is preferable that the segment dummy plate includes a projecting portion projecting from the iron core, and the projecting portion includes a retaining hole used for detaching the segment dummy plate.

Also, in the method of manufacturing the laminated rotor core according to the present invention, it is preferable that the resin injection hole of the segment dummy plate includes a taper portion opening into the die from the iron core.

Further, in the method of manufacturing the laminated rotor core according to the present invention, it is preferable that the segment dummy plate includes the resin injection hole formed, when viewed from the above, in a radially inward area of the one or more of the magnet insertion portions to be injected with the resin through the segment dummy plate.

In the method of manufacturing the laminated rotor core according to the present invention, it is possible that the segment dummy plate is a circular plate.

Also, in the method of manufacturing the laminated rotor core according to the present invention, it is possible that the segment dummy plate is a noncircular plate having a width expanding radially outward.

In the method of manufacturing the laminated rotor core according to the present invention, it is preferable that the segment dummy plate is made of a material different from the iron core sheets forming the iron core, and one or both surfaces of the segment dummy plate are coated with a coating material for improving detachability.

Effect of the Invention

In the method of manufacturing the laminated rotor core according to the present invention, the segment dummy plate covering one or more of the plural magnet insertion portions individually is arranged between the iron core and the die. This arrangement narrows each installation space of the segment dummy plates on the surface of the iron core. Compared to the method using an integrated plate covering all the magnet insertion holes, the surface of the iron core is less affected by warps (distortions) of the segment dummy plates, and also the segment dummy plates are less affected by the undulated surface of the iron core, which prevents the formation of the gap between the iron core and the segment dummy plates as well as the leakage of the resin. In addition, the size of the segment dummy plate can be small, and thus worker-hours of maintenances of the segment dummy plate to prevent the warps can be reduced.

Without the formation of the gap, the die can be set a low clamping pressure, and thus conventional problems caused by the clamping pressure, such as deterioration in the flatness of the iron core and resin cracking due to springback of the molded core sheets, can be prevented. Further, the formation of the gap between the adjacent core sheets in the laminated direction can be prevented.

In the repeated use of the segment dummy plates, only the dummy plate with the damaged portion around the resin injection hole needs to be replaced with a new one individually. If the small segment dummy plate is used, hardness of the small dummy plate can be increased by, for example, thermal treatment, and thus a rate of the deterioration of the resin injection hole can be reduced. Therefore, a life of the segment dummy plate can be prolonged and an exchange frequency thereof can be decreased. In addition, the segment dummy plate no longer require the increase of the rigidity (stiffness) for preventing the warps, and thus the segment dummy plate can be thin and the residual resin inside the resin injection hole can be reduced.

Using the segment dummy plates, when the segment dummy plates are detached from the iron core, each of the segment dummy plates are applied with forces in arbitrary direction, and thus the segment dummy plates can be detached from the iron core without stripes and dents of the resin in a depth direction.

For these reasons, the laminated rotor core can be manufactured effectively and economically without the process for removing the residual resin. Also, the resin leakage is prevented during the manufacture.

The degree of freedom for positioning of the resin reservoir part can be increased when the resin from the resin reservoir part is injected into the one or more of the magnet insertion portions corresponding to the resin passage through (a) the resin passage formed in the contact surface of the die and the segment dummy plate or (b) the resin passage formed in the segment dummy plate and the resin injection hole continuing to the resin passage.

When the segment dummy plate covers one part of the corresponding magnet insertion portion, the segment dummy plate can be further minimized, and thus the formation of the gap between the iron core and the segment dummy plate can be further prevented. The segment dummy plate covering the one part of the corresponding magnet insertion portion is stored in the dummy plate recesses in the die having the resin reservoir pot, and thus the other part of the magnet insertion portion is covered by the die and the leakage of the resin can be prevented.

If the dummy plate recesses storing the dummy plate covering the entire part of the magnet insertion portion is provided in the die having the resin reservoir pot, the die is in contact with the surface of the iron core. Thus, the die can press the surface of the iron core with equal force.

When the segment dummy plate includes the projecting portion having the retaining hole, the segment dummy plate can be easily detached from the iron core.

If the resin injection hole of the segment dummy plate includes the taper portion, the resin connecting the iron core and the segment dummy plate can be easily cut off.

If the segment dummy plate is made of, for example, the high-strength metal material other than the material of the iron core sheets forming the iron core, by removing the residual resin on the surface of the segment dummy plate, the segment dummy plate can be used repeatedly, and thus resource saving can be enhanced. If the segment dummy plate is made of inexpensive metal material or metal material reusing scraps, resource saving can be enhanced and the manufacturing cost can be reduced. If the segment dummy plate is made of resin material or thermal-resistant plastics, the segment dummy plate can be manufactured at a low cost and a shaping process thereof can be easily performed.

If the surface of the dummy plate in contact with the iron core is coated with a coating material improving the detachability of the iron core, the segment dummy plate can be easily detached from the iron core. If the surface of the dummy plate at the resin injection side is coated with a coating material improving the detachability of the iron core, the resin attached to the surface of the segment dummy plate can be easily removed, and this feature is advantageous for the repeated use of the segment dummy plate.

BRIEF DESCRIPTION OF DRAWINGS

FIG. 10 (B) is an explanatory view showing how to detach the segment dummy plate.

MODE FOR CARRYING OUT THE INVENTION

Figure 1:
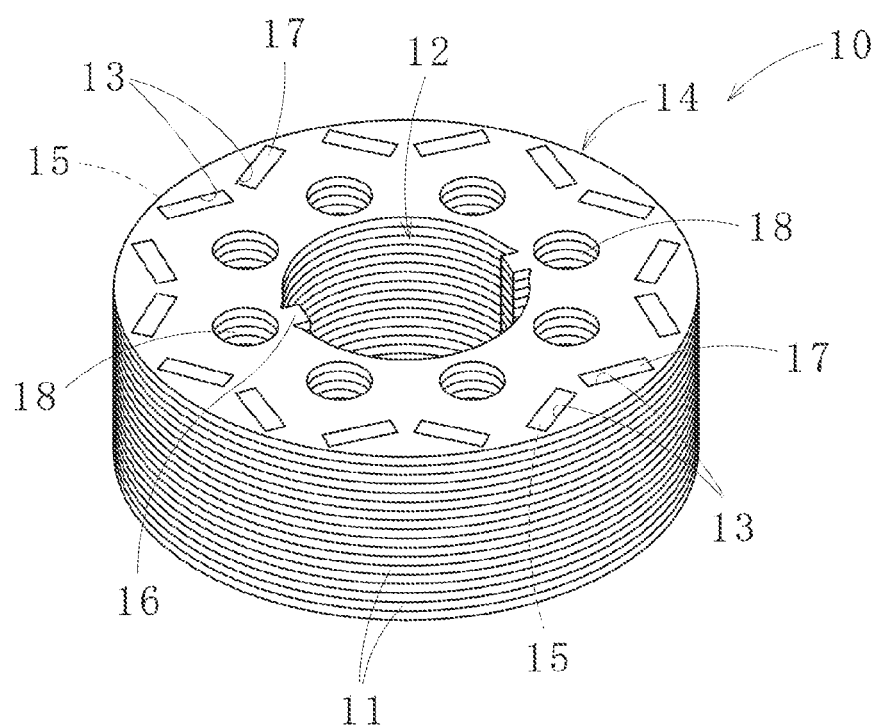
FIG. 1 is a perspective view of a laminated rotor core manufactured by a method of manufacturing a laminated rotor core according to a first embodiment of the present invention.

Referring to the accompanying drawings, embodiments of the present invention will be described for a better understanding of the invention.

Now, referring to FIGS. 1 and 2, a description will be given on a laminated rotor core (hereinafter simply referred to as a rotor core) 10 manufactured by a method of manufacturing a laminated rotor core according to a first embodiment of the present invention.

The rotor core (rotor) 10 is formed by laminating a plurality of core sheets 11 and inserting permanent magnets 15 into a plurality of magnet insertion holes (an example of magnet insertion portions) 13 formed around a central shaft hole 12 of an iron core 14.

Each of the iron core sheets 11 forming the iron core 14 is punched out in an annular shape from a magnetic steel sheet with a thickness of, for example, approximately 0.5 mm or less (specifically 0.15 to 0.5 mm). Alternatively, the iron core may be formed by spirally winding and laminating a plurality of continuing segment core sheets each having a circular-arc shape while bending the segment core sheets at connecting portions thereof, or by laminating a plurality of separate segment core sheets in an annular shape.

Here, the plural core sheets 11 can be laminated by combination of any one or more of interlocking (caulking), welding, and bonding. Alternatively, the iron core sheets 11 can be just flatly piled up.

The shaft hole 12 is a hole for mounting a shaft (not illustrated), and an internal area of the shaft hole 12 includes baffles (projections) 16 of the rotor core 10.

The plural (in this embodiment, 2×8=16) magnet insertion holes 13 are formed in an radially outward region of the iron core 14, penetrating through the iron core 14 in a vertical direction. Specifically, the magnet insertion holes 13 each have a rectangular cross section, and eight (plural) pairs of the magnet insertion holes 13 are arranged around the shaft hole 12 at equal spaces in a manner that each pair is arranged in an inverted-V shape in a plan view. However, the arrangement (the number) and the shape of the magnet insertion holes are not limited to the above, but can be the conventionally known ones.

After the permanent magnets 15 are inserted into the magnet insertion holes 13, a resin 17 is poured thereinto and solidified. For example, the resin can be thermoplastic resin or thermosetting resin such as epoxy resin conventionally used in manufactures of semiconductor devices.

To reduce the iron core 14 in weight, a plurality of (in this embodiment, eight) weight-saving holes 18 are formed between the shaft holes 12 and the magnet insertion holes 13 in the iron core 14 (i.e., in an radially inward region of the iron core 14). The weight-saving hole 18 has a circular cross section, but not limited thereto. For example, the weight-saving hole 18 can have a polygonal cross section or an ellipsoidal cross section. Also, the number of the weight-saving holes is not limited to the above.

In this regard, the weight-saving holes are not necessarily formed.

The rotor core 10 as described hereinabove is used for a motor.

Now, a description will be given on a method of manufacturing a laminated rotor core according to a first embodiment of the present invention.

Figure 2:
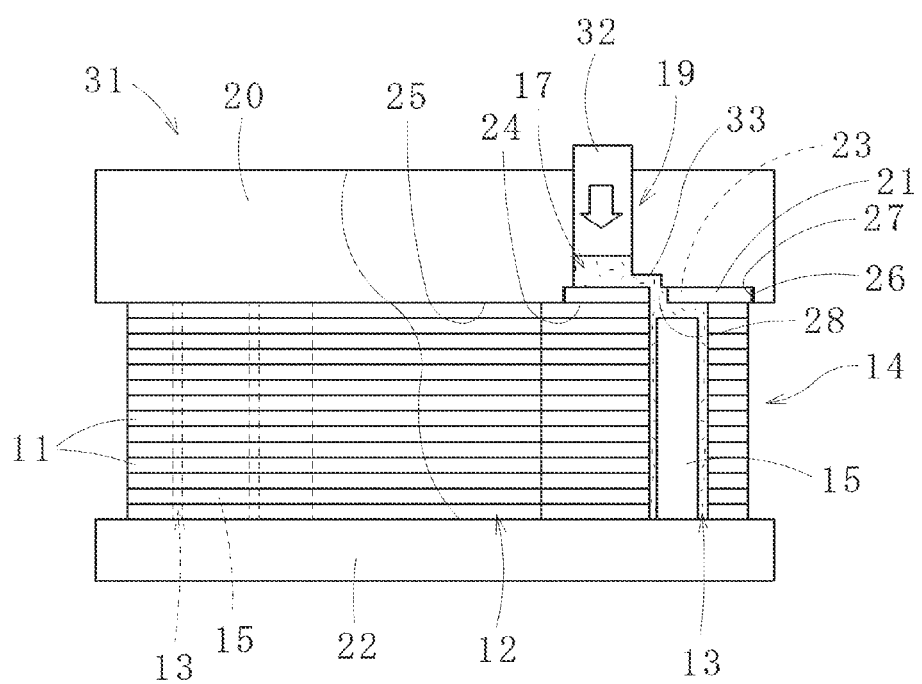
FIG. 2 is a partially-cutaway side view of an iron core that is being injected with resin by the method.

As shown in FIGS. 1 and 2, the plural core sheets 11 are punched out in annular shapes from the magnetic steel sheet (not illustrated) with the thickness of, for example, approximately 0.5 mm or less, and the punched-out core sheets 11 are sequentially laminated to form the iron core 14.

In this process, the shaft hole 12 is formed in a middle of the iron core 14, and the plural magnet insertion holes 13 penetrating the iron core 14 in the vertical direction are formed around the shaft hole 12. Then, the non-excited permanent magnets 15, each having a smaller cross section than that of the magnet insertion hole 13, are inserted into all the magnet insertion holes 13. Alternatively, excited permanent magnets may be inserted into all the magnet insertion holes 13.

Hereinafter, a description will be given on a first process.

Figure 3A:
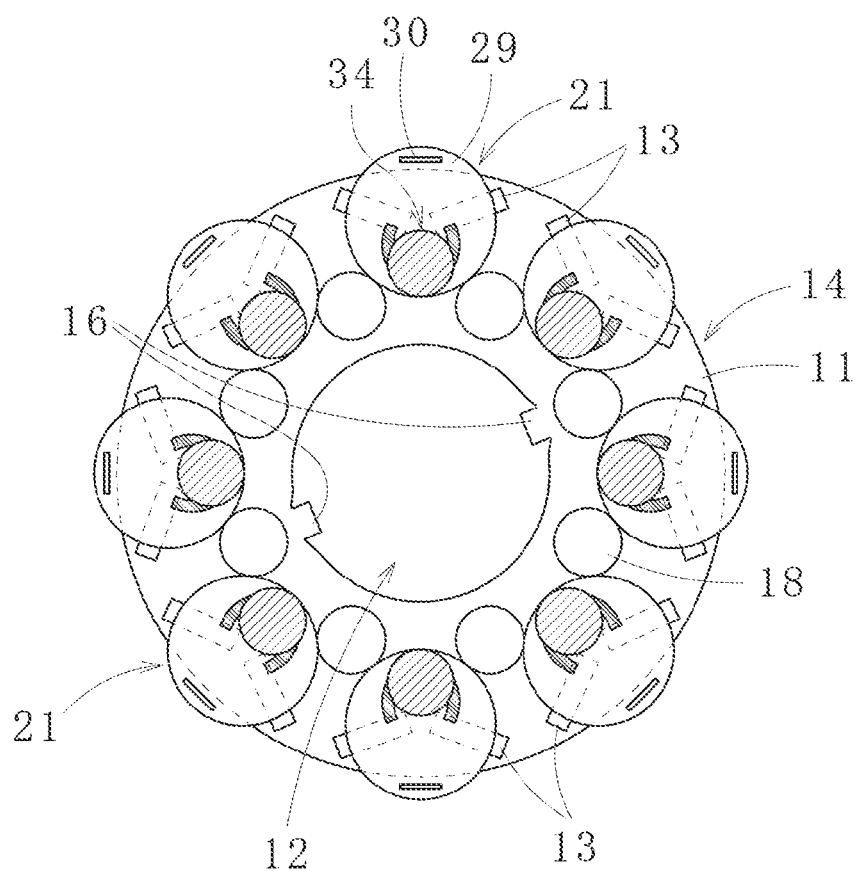
FIGS. 3 (A) and 3 (B) are a plan view and a partial side view of the iron core filled with resin injected by the method, respectively.
Figure 3B:
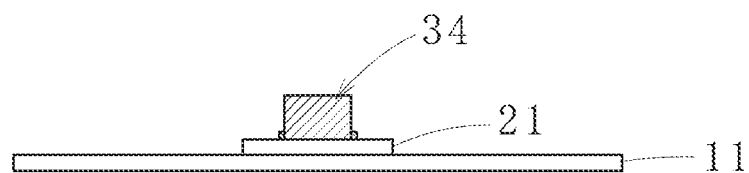

As shown in FIGS. 2 and 3, a plurality of (in this embodiment, eight) segment dummy plates 21 are placed on the surface (at an injection side of resin 17) of the iron core 14 adjoining to an upper die 20. The upper die 20 includes resin reservoir pots 19, an example of resin reservoir parts. After the iron core 14 is manufactured and before the iron core 14 is held (bound) with the upper die 20 and a lower die 22 (the upper and lower dies 20, 22 are referred to as a die device collectively), each of the segment dummy plates 21 is set on the surface of the iron core sheet 11 and arranged between the iron core 14 and the upper die 20.

As shown in FIGS. 2 and 3 (A), each of the segment dummy plates 21 is a circular plate and covers the two magnet insertion holes 13, forming a pair in a plan view, partially (i.e., excluding outer ends, in this embodiment). Here, the thickness of the segment dummy plate 21 is, for example, 0.5 times to 10 times the thickness of the iron core sheet 11.

In this embodiment, the segment dummy plates 21 do not cover the weight-saving holes 18. However, the segment dummy plates 21 may cover the weight-saving holes 18, so that the resin reservoir parts can be formed regardless of the positions of the weight-saving holes.

Also, the individual segment dummy plate 21 may cover one of the magnet insertion holes 13, or cover a plurality of (e.g., three or more) the magnet insertion holes 13 according to the number and position of the magnet insertion holes 13. The shape of the segment dummy plate 21 is not limited to a circle, but can be a polygon, such as a triangle (upside-down triangle) and a rectangle, or an ellipse.

As shown in FIG. 2, the segment dummy plates 21 are placed (stored) inside dummy plate recesses 23 formed in the upper plate 20 having the resin reservoir pots 19 such that undersurfaces 24 of the segment dummy plates 21 and an undersurface 25 of the upper die 20 are set at the same level. The plural dummy plate recesses 23 are formed in a radially outward region of the upper die 20 and arranged in a circumferential direction thereof at equal spaces. The dummy plate recess 23 is a depressed portion and a shape of the dummy plate recess 23 is slightly larger than that of the segment dummy plate 21. Also, a side surface 26 of the segment dummy plate 21 and an internal surface 27 of the dummy plate recess 23 have a small gap (e.g., 40 μm or less) therebetween, which can prevent the leakage of the resin. Accordingly, parts of the magnet insertion holes 13 uncovered by the segment dummy plates 21 are covered by the undersurface 25 of the upper die 20.

As shown in FIG. 2, each of the segment dummy plates 21 includes a resin injection hole (small hole) 28 continuing to the magnet insertion hole 13.

The resin injection hole 28 is smaller than a cross-sectional dimension of the magnet insertion hole 13 to be poured with the resin. The resin injection hole 28 is formed in a radially inward side in an area overlapped with the magnet insertion holes 13 in a plan view. In accordance with, for example, a layout of the permanent magnets 15 to be inserted in the magnet insertion holes 13 or a position of the resin reservoir pot 19, the resin injection hole 28 may be formed in a radially outward side in the area overlapped with the magnet insertion holes 13. In some cases, the resin injection hole 28 may be formed in a center of the overlapped area.

The resin injection hole 28 is overlapped with the magnet insertion holes 13 when viewed from above to maintain a fluidity of the resin and to inject the resin stably.

The resin injection hole 28 is set smaller than a cross-sectional dimension of the permanent magnet 15. Thus, it is possible in the manufacture of the rotor core 10 that after the permanent magnets 15 are inserted into the magnet insertion holes 13 of the iron core 14, the segment dummy plates 21 having the resin injection holes 28 are placed on an uppermost part of the iron core 14. It is also possible that the permanent magnets 15 are inserted into the magnet insertion holes 13 from an end (adjoining to the lower die 22 of the iron core 14) opposite to the segment dummy plates 21. In addition, if the resin injection hole has the same shape as the magnet insertion hole 13 formed in the iron core 14 in a plan view, the permanent magnet 15 can be inserted into the magnet insertion hole 13 through the resin injection hole.

Each of the segment dummy plates 21 includes a projecting portion 29, projecting to a radially outward side of the iron core 14 in a plan view. The projecting portion 29 includes a retaining hole 30 having a rectangular cross-section. The retaining hole 30 is used when the segment dummy plate 21 is detached from the iron core 14. Here, a maximum projecting length in a radial direction of the projecting portion 29 is, for example, approximately 3 to 10 mm. The shape of the retaining hole is not limited to the above, but can be a polygon such as triangles or an ellipse.

The segment dummy plate 21 may be made from the same metallic material as the iron core sheet 11 or the different material. Preferably, the metallic material can be treated with heat.

When the segment dummy plate is made from a metallic material different from the iron core sheet 11, such as a stainless steel plate, a steel plate, and an aluminum alloy, one or both surfaces of the segment dummy plate is coated with a coating material for improving detachability. The coating material can be fluorine series, polytetrafluoroethylene series (Teflon® series), Cr (chrome) plating, Ni (nickel) plating, etc. For a repeated use of the segment dummy plate, inexpensive Ni plating is preferable. In this regard, the strength of the segment dummy plate can be improved by setting the thickness of segment dummy plate thicker (e.g., by approximately 1.2 times to 10 times) than that of the iron core sheet.

Further, the segment dummy plate can be made of resin materials such as epoxy resin or heat-resistant plastic materials, which allows an inexpensive production and an easy shaping of the segment dummy plate.

Hereinafter, a description will be given on a second process.

In the second process, as shown in FIG. 2, the iron core 14 held with the upper and lower dies 20, 22 of a resin-sealing device 31 is preheated, the liquid resin 17 is poured from the resin reservoir pot 19 provided in the upper plate 20 to each of the magnet insertion holes 13 and cured, and then the permanent magnets 15 are fixed inside the magnet insertion holes 13. Here, the iron core 14 is preferably preheated by a preheating device before being held with the upper and lower dies 20, 22 of the resin-sealing device 31.

In the upper die 20 of the resin-sealing device 31 in use, the resin reservoir pot 19 is provided for heating and liquefying materials (pellets) of the resin 17 such that the resin reservoir pot 19 extends to an edge of the upper die 20 adjoining to the segment dummy plate 21 (i.e., penetrates the upper die 20 in a vertical direction).

The resin-sealing device 31 includes plungers 32, which can move up and down inside the resin reservoir pot 19. The plunger 32 pushes out the molten resin 17 from the resin reservoir pot 19, and the resin 17 passes through a resin passage 33 formed on a surface in contact with the segment dummy plate 21 of the upper die 20 and continuing to a downstream edge of the resin reservoir pot 19. Then, the resin 17 is injected through the resin injection hole 28 to a radially inward side of the permanent magnet 15 placed inside the magnet insertion hole 13, and the magnet insertion hole 13 is finally filled with the resin 17. In this embodiment, the resin 17 is the epoxy resin, an example of thermosetting resins, but can be other thermosetting resins or thermoplastic resins. In the use of the epoxy resin, since a melting temperature of the epoxy resin is approximately 170° C., the iron core 14 is preheated (or heated by the die device) to approximately 170° C. within plus or minus 20° C.

After the resin 17 is injected into all the magnet insertion holes 13, the iron core is further heated by the die device to cure the resin 17, and therefore the permanent magnets 15 inserted in the magnet insertion holes 13 can be fixed with the resin 17.

Now, the resin reservoir pot 19 is arranged not to overlap with the resin injection hole 28 provided in the segment dummy plate 21 adjoining to the upper die 20 in a plan view, but can be arranged to overlap therewith. If the resin reservoir pot 19 is arranged to overlap with the resin injection hole 28, it is not necessary to form the resin passage in the upper die 20.

The resin can be injected by a resin-sealing device including resin reservoir pots, which are formed in a lower die and operable to heat and liquefy materials (pellets) of the resin. In this case, the segment dummy plate 21 including the resin injection hole 28 is arranged in an undersurface of the iron core 14 and in contact with the lower die. With this arrangement, the magnet insertion hole 13 formed in the iron core 14 opens upward, and thus the permanent magnet 15 can be inserted into the magnet insertion hole 13 from a side of the iron core sheet 11 located in a surface opposite to the segment dummy plate 21. And, the liquefied resin pushed out of the resin reservoir pot by the plunger passes through a resin passage formed on a surface in contact with the segment dummy plate of the lower die and continuing to the downstream edge of the resin reservoir pot, and the resin is finally poured through the resin injection hole 28 into each of the magnet insertion holes 13.

As shown in FIGS. 2 and 3 (A), the plural resin reservoir pots 19 are arranged in the upper die 20 at equal spaces in a circumferential direction, so that the resin 17 is injected from one resin reservoir pot 19 into two magnet insertion holes 13.

With this arrangement, the liquefied resin 17 can be supplied to the magnet insertion holes 13 from the resin reservoir pots 19, through the resin passages 33 formed in a bottom of the upper die 20 and continuing to the resin reservoir pots 19 as well as the resin injection holes 28 of the segment dummy plates 21.

Hereinafter, a description will be given on a third process.

As shown in FIGS. 3 (A), 3 (B), 4 (A), and 4 (B), after the resin 17 injected into the magnet insertion holes 13 is cured, the segment dummy plates 21 together with excess resin (residual cured resin) 34 are removed. The excess resin 34 is the resin remained and cured in the resin reservoir pots 19, the resin injection holes 28, and the resin passages 33.

The segment dummy plates 21 can be removed (detached) by machines, or by manual works of operators without special processes or equipment.

Figures 4A, 4B, 4C, 4D:
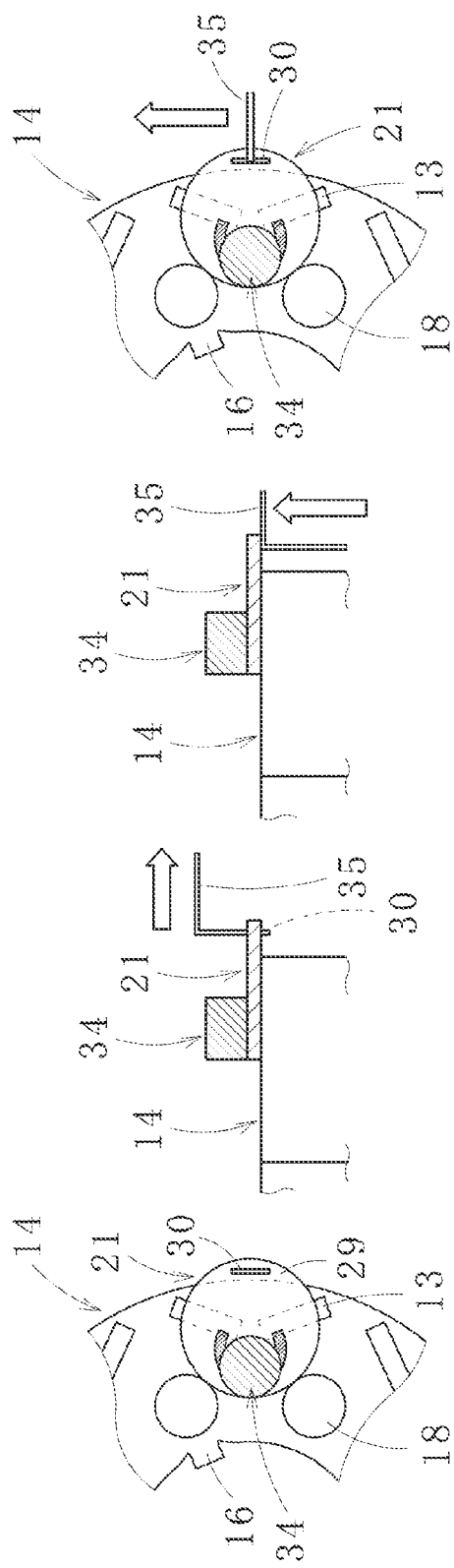
FIG. 4 (A) is a partial plan view of the iron core filled with resin injected by the method, and FIGS. 4 (B) to 4 (D) are explanatory views showing how to detach a segment dummy plate from the iron core, respectively.

For example, as shown in FIG. 4 (B), a L-shaped removing jig 35 can be used. A tip of the removing jig 35 is hooked in the retaining hole 30 of the segment dummy plate 21, and the removing jig 35 is faced in a radially outward direction of the iron core 14 and pulled in a horizontal direction.

As a first alternative shown in FIG. 4 (C), a corner of the removing jig 35 is pressed against an undersurface of the projecting portion 29 of the segment dummy plate 21, and the segment dummy plate 21 is pushed up from the surface of the iron core 14.

As a second alternative shown in FIG. 4 (D), the tip of the removing jig 35 is hooked in the retaining hole 30 of the segment dummy plate 21, and the segment dummy plate is twisted and pulled in a circumferential direction of the iron core 14.

Figure 5A:
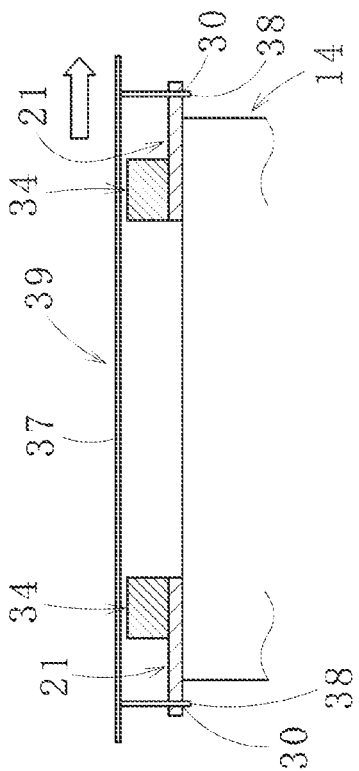
FIGS. 5 (A) and 5 (B) are explanatory views showing how to detach the segment dummy plate, respectively.
Figure 5B:
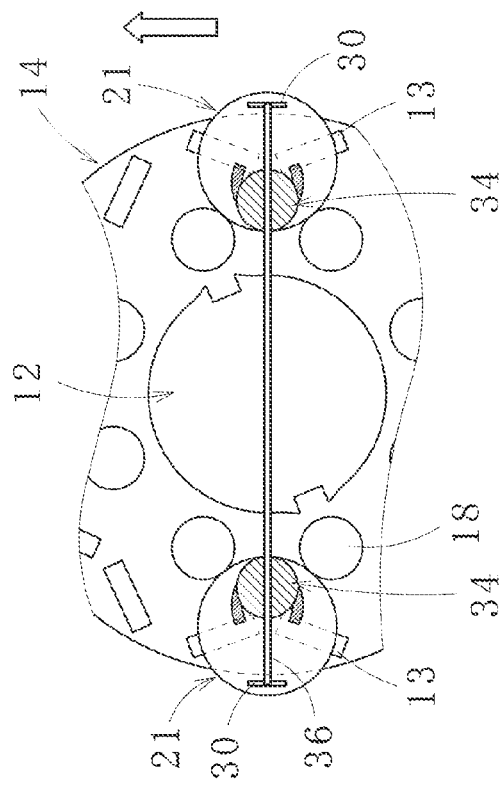

As a third alternative shown in FIG. 5 (A), a removing jig 36 having both ends bent at a right angle can be used. The both ends of the removing jig 36 are respectively hooked in the retaining holes 30 of the segment dummy plates 21 placed opposite to each other around the shaft hole 12, and the segment dummy plates 21 are pulled twisted and pulled in a circumferential direction of the iron core 14 by rotating the removing jig 36 around a middle portion thereof.

As a fourth alternative shown in FIG. 5 (B), a removing jig 39, which is a stick 37 having right-angled hooking portions 38 at both ends, can be used. The hooking portions 38 are respectively hooked in the retaining holes 30 of the segment dummy plates 21 placed opposite to each other around the shaft hole 12, and the removing jig 39 is horizontally pulled from one end to the other end in a diametrical direction of the iron core 14.

With the above-described methods, the resin 17 filled in the magnet insertion holes 13 and the resin 17 in the resin injection holes 28 of the segment dummy plates 21 are disconnected.

Now, the segment dummy plates 21 removed from the iron core 14 may be disposed after the third process is completed, but preferably used repeatedly. In the repeated use, the segment dummy plate 21 with the residual resin 17 inside the resin injection hole 28 is flipped upside down, and a pressing member (not-illustrated) is moved down toward the segment dummy plate 21 and inserted into the resin injection hole 28 in order to push the resin 17 out of the resin injection hole 28. By this way, the excess resin 34 attached to each of the segment dummy plates 21 are eliminated, and thus the segment dummy plates 21 can be used repeatedly.

As described hereinabove, by the use of the segment dummy plates 21, a force can be applied on each of the segment dummy plates 21 in a certain direction when the segment dummy plates 21 is detached from the iron core 14. Thus, the excess resin 34 (e.g., runner and cull) remains attached to the surface of each of the segment dummy plates 21 can be removed together with the segment dummy plates 21 from the iron core 14 without removing the resin 17 inside the magnet insertion hole in a depth direction.

Therefore, with the method of manufacturing the laminated rotor core according to the first embodiment of the present invention, the laminated rotor core with high quality can be manufactured economically, achieving a reduction of manufacturing time. In addition, if projections (or recesses) are formed in a peripheral area of the segment dummy plate, which is circular when viewed from the above, and recesses (or projections) engaging therewith are formed in a die to be mounted with the dummy plate, then a positioning of the dummy plate can be easily performed (the same applies to the following embodiments).

Now, a description will be given on differences between the method described hereinabove and a method of manufacturing a laminated rotor core according to a second embodiment of the present invention (the same applies to the following embodiments).

Figure 6:
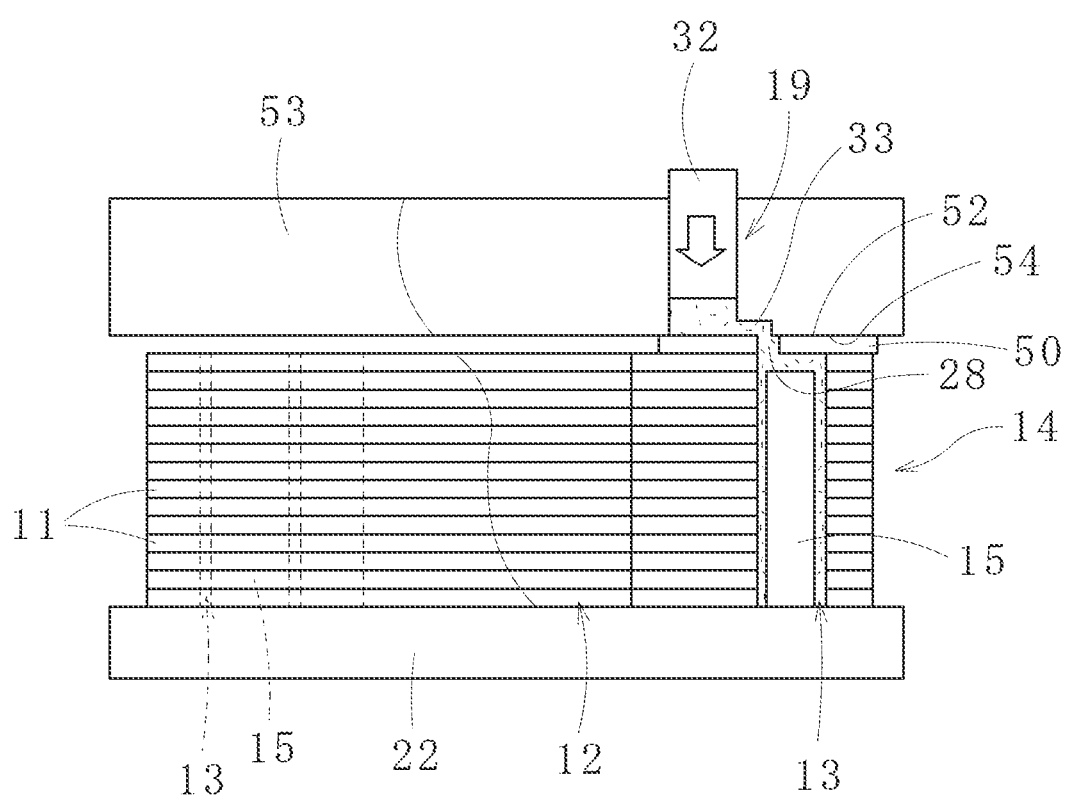
FIG. 6 is a partially-cutaway side view of an iron core that is being injected with resin by a method of manufacturing a laminated rotor core according to a second embodiment of the present invention.
Figure 7A:
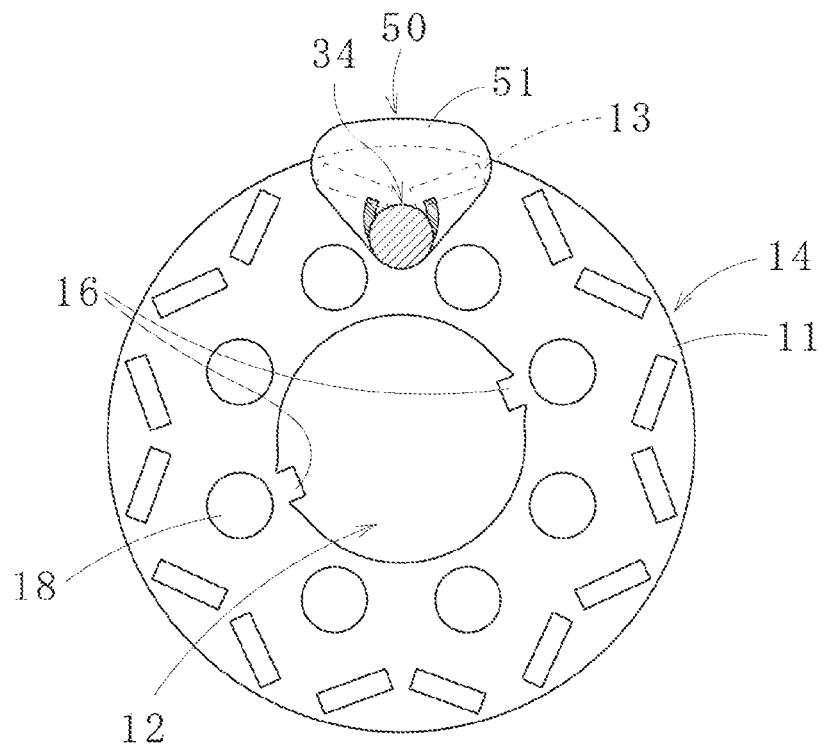
FIGS. 7 (A) and 7 (B) are a plan view and a partial side view of the iron core filled with resin injected by the method, respectively.
Figure 7B:
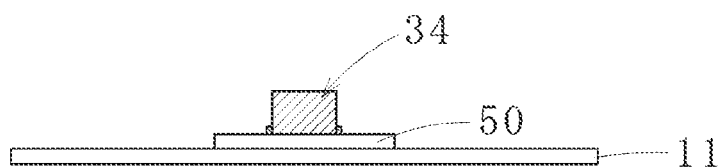

As shown in FIGS. 6, 7 (A), and 7 (B), a segment dummy plate 50 can be used for removing the excess resin 34. All the magnet insertion holes 13 in the iron core 14 are covered with the plural segment dummy plates 50, but FIGS. 6, 7 (A), and 7 (B) show one segment dummy plate 50 and omit the others for convenience (the same applies to the following embodiments).

Each of the segment dummy plates 50 has a radially outwardly expanded noncircular shape, and independently covers the entire part of one pair of the magnet insertion holes 13 in a plan view. Specifically, the segment dummy plate 50 covers the two magnet insertion holes 13 entirely without blocking the weight-saving hole 18. Further, the segment dummy plate 50 includes a projecting portion 51 projecting to a radially outward side of the iron core 14 in a plan view. The projecting portion 51 has the same functional effect as the projecting portion 29.

A top surface 52 of the segment dummy plate 50 is in contact with an undersurface 50 of an upper die 53 (approximately the same as the upper die 20) having the resin reservoir pot 19. However, the dummy plate recess for storing the segment dummy plate 50 may be provided in the upper die having the resin reservoir pots (see FIG. 2). In this case, the dummy plate recess stores the segment dummy plate such that the undersurface of the segment dummy plate and the undersurface of the upper die have are set at the same level. Thus, all the magnet insertion holes 13 are covered with the plural segment dummy plates 50, and the top surface of the iron core 14 is in contact with the undersurface of the upper die. Therefore, forces from the die device evenly act on the iron core 14.

Figure 8A:
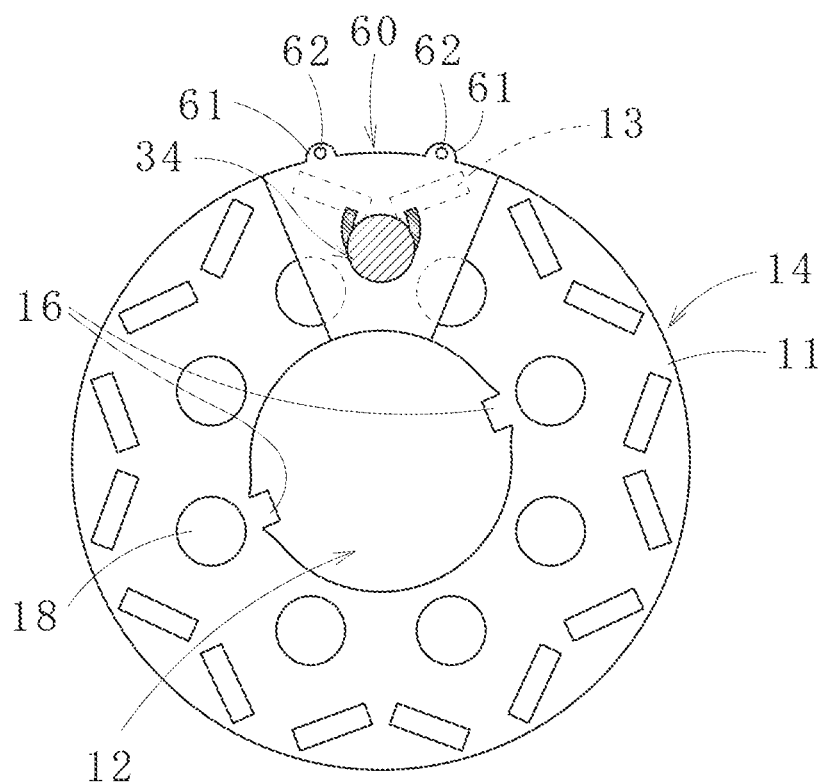
FIGS. 8 (A) and 8 (B) are a plan view and a partial side view of a segment dummy plate used in a method of manufacturing a laminated rotor core according to a third embodiment of the present invention, respectively.
Figure 8B:
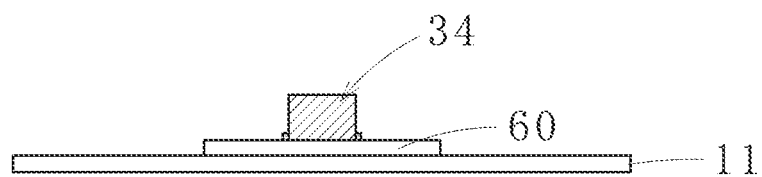

Referring to FIG. 8, a description will be given on a method of manufacturing a laminated rotor core according to a third embodiment of the present invention.

As shown in FIGS. 8 (A) and 8 (B), a segment dummy plate 60 can be used for removing the excess resin 34.

The segment dummy plates 60 are formed by circumferentially dividing the iron core sheet 11 into plural pieces, and each of the segment dummy plates 60 has a circular-arc shape (fan shape). When viewed from the above, the segment dummy plates 60 cover the entire core 14 from an inner edge to an outer edge. Also, each of the segment dummy plates 60 covers the two magnet insertion holes 13 entirely, which are corresponding to each other when viewed from the above. Here, the number of the segment dummy plates 60 is half the total number of the magnet insertion holes 13, and all the magnet insertion holes 13 are covered with the plural segment dummy plates 60.

The segment dummy plates 60 neighboring in the circumferential direction of the iron core 14 are in contact with each other, but may have a small gap (e.g., 2 mm or less).

Each of the segment dummy plates 60 includes two (or plural) projecting portions 61 projecting to a radially outward side of the iron core 14 in a plan view. Each of the projecting portions 61 includes a circular retaining hole 62 used for removing the segment dummy plate 60. The two projecting portions 61 are formed with a gap therebetween in the circumferential direction of the iron core 14.

Additionally, each of the segment dummy plates 60 are arranged to block all the weight-saving holes 18, which increases a degree of freedom (flexibility) for positioning the resin reservoir pot 19 in the surface of the iron core 14. Therefore, the resin 17 can be poured into the magnet insertion holes 13 effectively.

The segment dummy plates 60 each can be placed in the surface of the iron core 14 by inserting positioning pins in the retaining holes 62.

Also, when the segment dummy plates 60 each are removed from the iron core 14, by using the retaining holes 62, the segment dummy plates 60 each are directed in a radially outward direction of the iron core 14 and horizontally pulled.

Figure 9A:
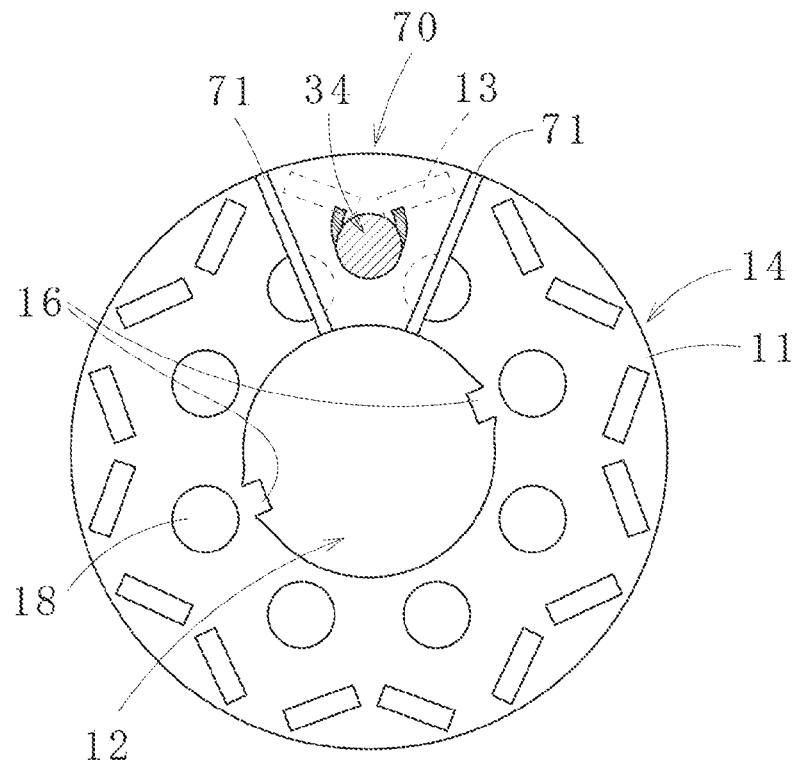
FIGS. 9 (A) and 9 (B) are a plan view and a partial side view of a segment dummy plate used in a method of manufacturing a laminated rotor core according to a fourth embodiment of the present invention, respectively.
Figure 9B:
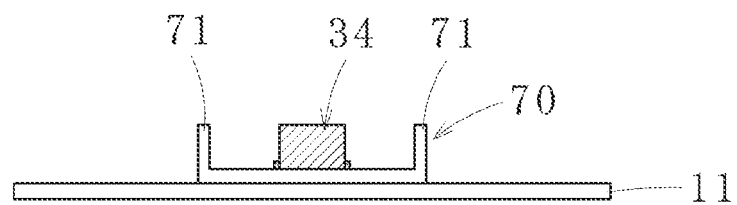

Referring to FIG. 9, a description will be given on a method of manufacturing a laminated rotor core according to a fourth embodiment of the present invention.

As shown in FIGS. 9 (A) and 9 (B), a segment dummy plate 70 can be used for removing the excess resin 34. The segment dummy plate 70 and the segment dummy plate 60 are identical except for the shape of the projecting portion.

The segment dummy plates 70 are formed by circumferentially dividing the iron core sheet 11 into plural pieces, and each of the segment dummy plates 70 has a circular-arc shape. The segment dummy plates 70 cover the entire core 14 from the inner edge to the outer edge. Each circumferential end of the segment dummy plate 70 includes a projecting portion 71 projecting above the iron core 14.

A projecting height of the projecting portion 71 from the surface of the iron core 14 is, for example, approximately 1 to 10 mm.

The projecting portion 71 is formed along the radial direction of the iron core 14 from the inner edge (shaft hole 12) to the outer edge (outer periphery). However, the plural projecting portions 71 may be formed along the radial direction of the iron core 14 with one or more gaps therebetween. Further, the retaining hole may be provided in the projecting portion.

When the iron core 14 is held by the upper and lower dies with the segment dummy plates 70 having the projecting portions 71, it is preferable to form depressed portions larger than the projecting portions 71 in parts of the upper die contacting the projecting portions 71. With the depressed portions, the undersurface of the upper die can be in contact with the upper surfaces of the segment dummy plates 70.

In this case, the segment dummy plates 70 can be removed from the iron core 14 by holding and pulling up the projecting portions 71. As an alternative example, the projecting portions 71 may be rotated in the circumferential direction of the iron core 14.

Figure 10A:
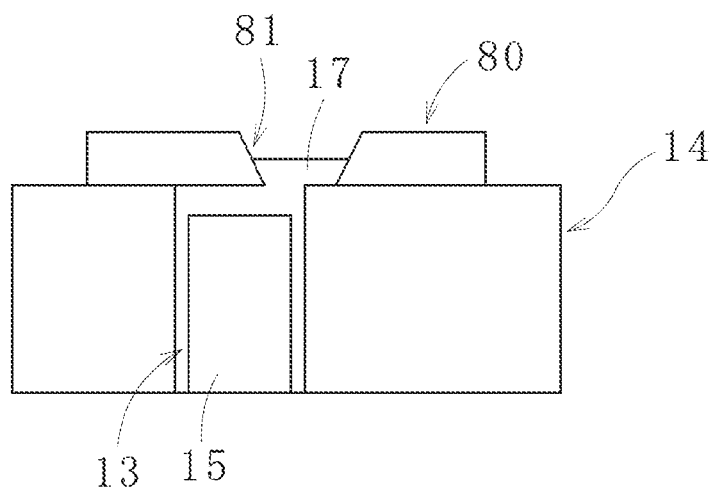
FIG. 10 (A) is a partial side sectional view of a segment dummy plate arranged in an iron core for use in a method of manufacturing a laminated rotor core according to a fifth embodiment of the present invention.
Figure 10B:
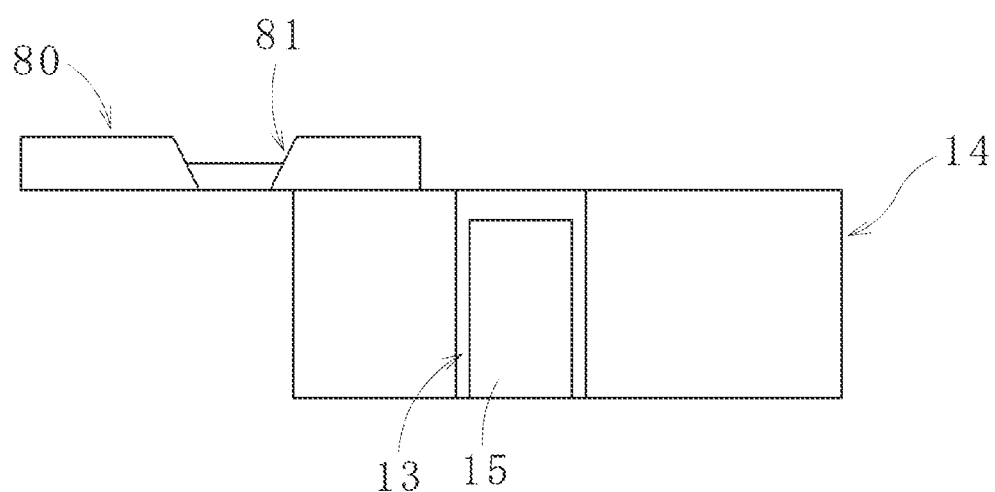

Referring to FIG. 10, a description will be given on a method of manufacturing a laminated rotor core according to a fifth embodiment of the present invention.

As shown in FIGS. 10 (A) and 10 (B), a segment dummy plate 80 can be used for facilitating removal of the excess resin 34.

The segment dummy plate 80 includes a resin injection hole 81 having a taper portion opening into the upper die from the iron core 14 (i.e., expanding a diameter thereof). When viewed from the above, a part (e.g., approximately half) of the resin injection hole 81 is overlapped with the magnet insertion hole 13. A tip (lower end) of the taper portion serves as a notch for the cured resin 17, and thus the subsequent process of removing the excess resin 34 becomes easy. The overlapped amount is determined in view of the flowability and curing time of the resin to be poured. In this embodiment, each of the resin injection holes 81 includes the taper portion, but the taper portions may be provided in some of the resin injection holes 81.

With this structure, the resin can be cut off easily, and the projection of the resin on the surface of the iron core 14 can be prevented and further eliminated.

Figure 11:
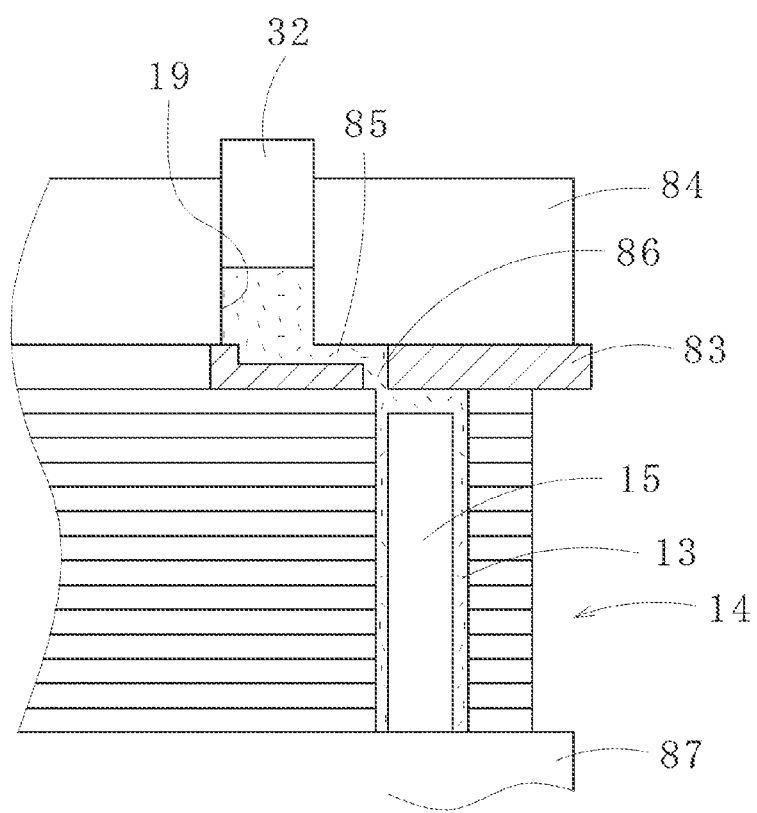
FIG. 11 is a partially-cutaway sectional view of an iron core that is being injected with resin by a method of manufacturing a laminated rotor core according to a sixth embodiment of the present invention.

Referring to FIG. 11, a description will be given on a method of manufacturing a laminated rotor core according to a sixth embodiment of the present invention.

As shown in FIG. 11, in the method of manufacturing the laminated rotor core according to this embodiment, each segment dummy plate 83 includes a resin passage 85 and a resin injection hole 86, which guide the resin 17 from the resin reservoir pot 19 formed in an upper die (an example of the die device) 84 to the magnet insertion hole 13 of the iron core 14. With this structure, the resin passage is not necessarily formed in the upper die 84, and therefore the resin can be injected into many types of the iron cores by changing the segment dummy plates. Now, it is possible to dispose a guide member positioning the segment dummy plates between the upper die 84 and the iron core 14. In the figure, a numeral 87 shows a lower die.

Figure 12:
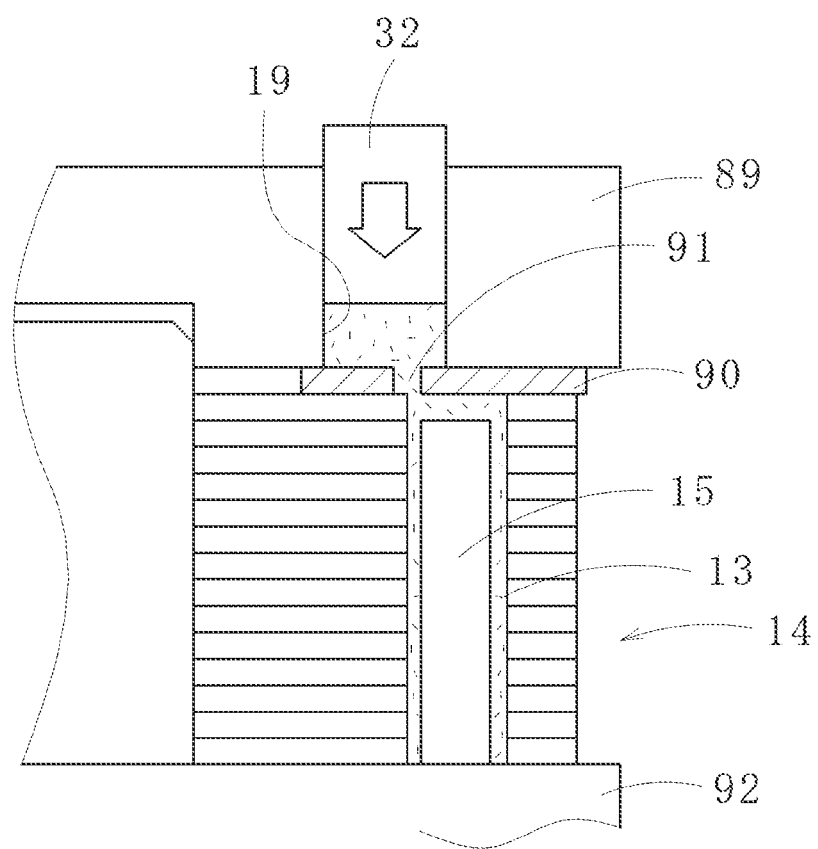
FIG. 12 is a partially-cutaway sectional view of an iron core that is being injected with resin by a method of manufacturing a laminated rotor core according to a seventh embodiment of the present invention.
Figure 13:
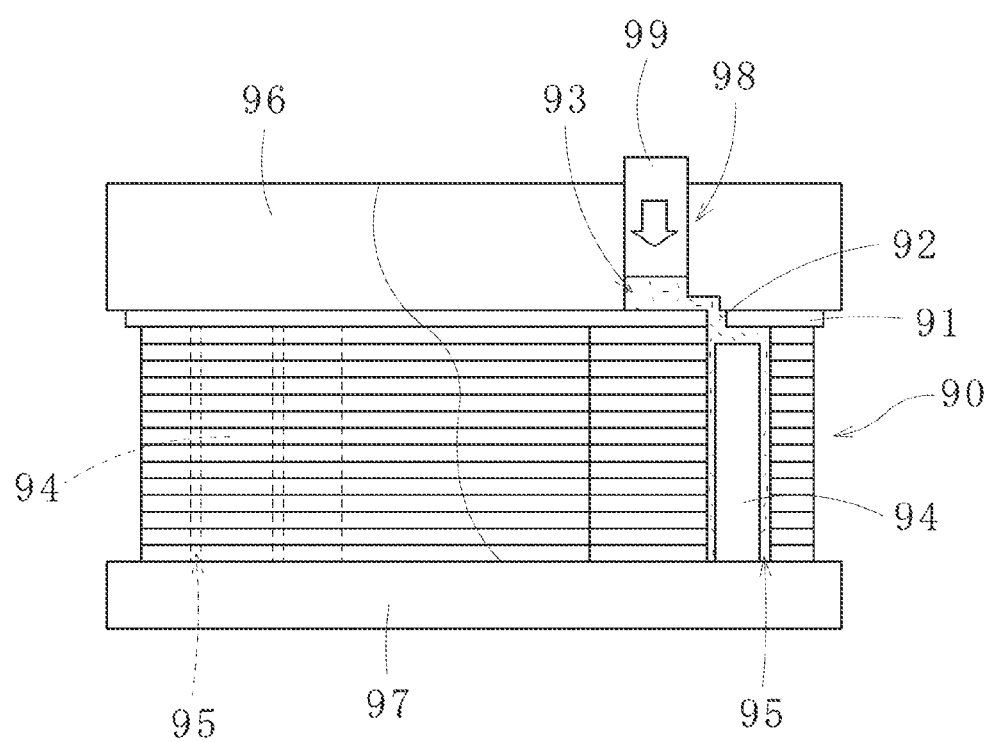
FIG. 13 is a partially-cutaway sectional view of an iron core that is being injected with resin by a method of manufacturing a laminated rotor core according to a prior art.

Referring to FIG. 12, a description will be given on a method of manufacturing a laminated rotor core according to a seventh embodiment of the present invention.

As shown in FIG. 12, in the method of manufacturing the laminated rotor core according to this embodiment, the resin reservoir pot 19 formed in an upper die 89 is overlapped with the position of the magnet insertion hole 13 when viewed from the above. Accordingly, the resin reservoir pot 19 is located right above the segment dummy plate 90, and the magnet insertion hole 13 is located right below the segment dummy plate 90. The resin reservoir pot 19, the magnet insertion hole 13, and the segment dummy plate 90 are linked together by the resin injection hole 91. Through the resin injection hole 91, the resin 17 is directly injected into the magnet insertion hole 13 from the resin reservoir pot 19. With this structure, the resin passage is not necessarily formed in the upper die 89 or the segment dummy plate 90, and thus the usage of the resin man be minimized. A cross-sectional area of the resin injection hole 91 is smaller than those of the resin reservoir pot 19 and the magnet insertion hole 13. In this figure, a numeral 92 shows a lower die.

While the embodiments of the present invention have been described above, the present invention is not limited to the above-described embodiments, and other embodiments and various modifications may be made without departing from the scope of the present invention. For example, the scope of the present invention covers a method of manufacturing a laminated rotor core according to the present invention comprising a combination of a part or whole of the above-described embodiments and modifications.

In the above-described embodiments, the segment dummy plates are arranged on the surface of the iron core. However, the segment dummy plates may be provided in the upper (or lower) die by an elevating means (not-illustrated) to move the segment dummy plates up and down with respect to the upper (or lower) die, so that the segment dummy plates are used repeatedly.

INDUSTRIAL APPLICABILITY

The method of manufacturing the rotor core according to the present invention can be applied to, for example, productions of rotors used for motors of automobiles or home appliances. The method enables reliable and easy sealing of the permanent magnets in the rotor with resin, easy removal of the attached resin after the resin sealing, and prevention of leakage of the resin. Therefore, the laminated rotor core can be manufactured effectively and economically.

DESCRIPTION OF NUMERALS

10: laminated rotor core; 11: core sheet; 12: shaft hole; 13: magnet insertion hole (magnet insertion portion); 14: iron core; 15: permanent magnet; 16: baffle; 17: resin; 18: weight-saving hole; 19: resin reservoir pot (resin reservoir part); 20: upper die; 21: segment dummy plate; 22: lower die; 23: dummy plate recess; 24, 25: undersurface; 26: side surface; 27: internal surface; 28: resin injection hole; 29: projecting portion; 30: retaining hole; 31: resin sealing device; 32: plunger; 33: resin passage; 34: excess resin; 35, 36: removing jig; 37: stick; 38: hooking portion; 39: removing jig; 50: segment dummy plate; 51: projecting portion; 52: top surface; 53: upper die; 54: undersurface; 60: segment dummy plate; 61: projecting portion; 62: retaining hole; 70: segment dummy plate; 71: projecting portion; 80: segment dummy plate; 81: resin injection hole; 83: segment dummy plate; 84: upper die; 85: resin passage; 86: resin injection hole; 87: lower die; 89: upper die; 90: segment dummy plate; 91: resin injection hole; 92: lower die

The invention claimed is:

1. A method of manufacturing a laminated rotor core, including laminating a plurality of core sheets to form an iron core with a plurality of magnet insertion portions, inserting permanent magnets into the magnet insertion portions of the iron core and injecting resin into the magnet insertion portions from resin reservoir parts formed in any one of an upper die and a lower die holding the iron core, and thereby fixing the permanent magnets, the method comprising:
 a first process of placing segment dummy plates between the iron core and the die, each of the segment dummy plates covering one or more of the plural magnet insertion portions and including a resin injection hole communicating to the one or more of the magnet insertion portions;
 a second process of injecting the resin from each of the resin reservoir parts of the die through the resin injection hole of each dummy plate to the corresponding one or more of the magnet insertion portions; and
 a third process of detaching the segment dummy plates together with excess resin after the resin injected to the one or more of the magnet insertion portions is cured.

2. The method of manufacturing the laminated rotor core as defined in claim 1, wherein the resin from the resin reservoir parts is injected into the corresponding one or more of the magnet insertion portions through a resin passage formed on a surface of the die contacting the corresponding segment dummy plate.

3. The method of manufacturing the laminated rotor core as defined in claim 1, wherein the resin from the resin reservoir parts is injected into the corresponding one or more of the magnet insertion portions through a resin passage formed in the corresponding segment dummy plate and the resin injection hole communicating to the resin passage.

4. The method of manufacturing the laminated rotor core as defined in claim 1, wherein when viewed from above, the resin reservoir parts and the magnet insertion portions are partly overlapped, and the resin from the resin reservoir parts is injected directly into the corresponding one or more of the magnet insertion portions through the resin injection holes formed in the segment dummy plates.

5. The method of manufacturing the laminated rotor core as defined in claim 1, wherein the die with the resin reservoir parts includes dummy plate recesses each housing a segment dummy plate, each of the segment dummy plates covers one part of the corresponding one or more of the magnet insertion portions and the die covers the other part of the one or more of the magnet insertion portions.

6. The method of manufacturing the laminated rotor core as defined in claim 1, wherein an entire part of the one or more of the magnet insertion portions corresponding to a segment dummy plate is covered by the segment dummy plate.

7. The method of manufacturing the laminated rotor core as defined in claim 1, wherein the segment dummy plates include a projecting portion projecting from the iron core, and the projecting portion includes a retaining hole used for detaching the segment dummy plates.

8. The method of manufacturing the laminated rotor core as defined in claim 1, wherein the resin injection hole of the segment dummy plates includes a taper portion opening into the die from the iron core.

9. The method of manufacturing the laminated rotor core as defined in claim 1, wherein the segment dummy plates include the resin injection hole formed, when viewed from above, in a radially inward area of the one or more of the magnet insertion portions to be injected with the resin through the segment dummy plates.

10. The method of manufacturing the laminated rotor core as defined in claim 1, wherein each segment dummy plate is a circular plate.

11. The method of manufacturing the laminated rotor core as defined in claim 1, wherein each segment dummy plate is a noncircular plate having a width expanding radially outward.

12. The method of manufacturing the laminated rotor core as defined in claim 1, wherein the segment dummy plates are made of a material different from the iron core sheets forming the iron core, and one or both surfaces of the segment dummy plates are coated with a coating material for improving detachability.

* * * * *